Dec. 22, 1925.
J. B. KRING ET AL
1,566,967
CONVERTIBLE TOURING COUCH
Filed August 17, 1922    2 Sheets-Sheet 1
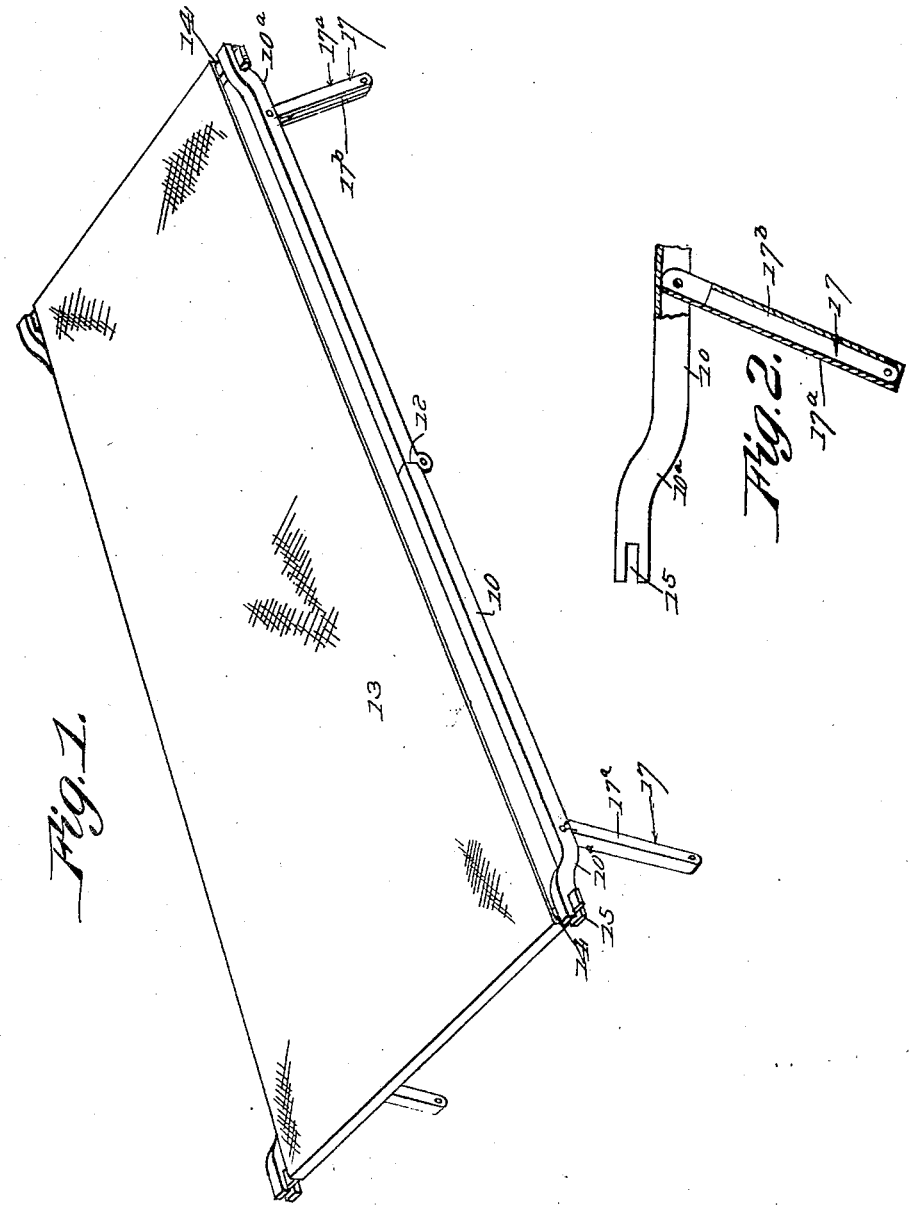
Inventors
J. B. Kring and
F. E. Peters,
By
Attorney Dec. 22, 1925.  1,566,967
J. B. KRING ET AL
CONVERTIBLE TOURING COUCH
Filed August 17, 1922   2 Sheets-Sheet 2
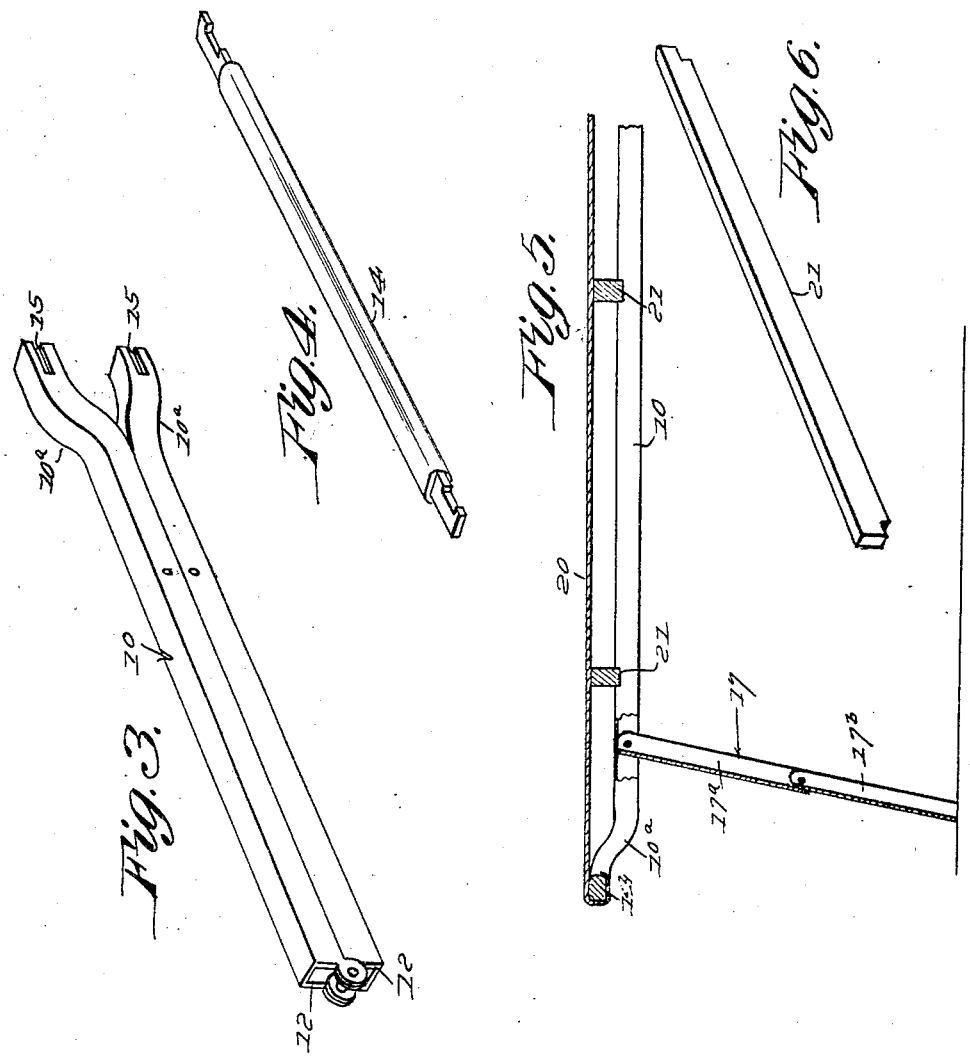

Patented Dec. 22, 1925.

1,566,967

UNITED STATES PATENT OFFICE.

JOHN B. KRING, OF GALION, AND FRANK E. PETERS, OF MARION, OHIO.

CONVERTIBLE TOURING COUCH.

Application filed August 17, 1922. Serial No. 582,476.

*To all whom it may concern:*

Be it known that JOHN B. KRING and FRANK E. PETERS, citizens of the United States of America, residing at Galion and Marion, in the counties of Crawford and Marion and State of Ohio, have invented new and useful Improvements in Convertible Touring Couches, of which the following is a specification.

The object of the invention is to provide a simple and efficient convertible couch and table adapted to be folded into compact form for touring and camping purposes and particularly adapted for support in and by the conventional features of an automobile or similar vehicle by means of the seat backs thereof; and with this object in view the invention consists in a construction and combination of parts of which a preferred embodiment is shown in the accompanying drawings, wherein:—

Figure 1 is a perspective view of a convertible couch constructed in accordance with the invention.

Figure 2 is a detail side view of one end of the same showing a detachable and adjustable leg member connected therewith as a supporting element.

Figure 3 is a view of one of the side members in its folded condition.

Figure 4 is a perspective view of a cross bar used in the couch structure.

Figure 5 is a fragmentary longitudinal sectional view of the structure showing the same set up as a table.

Figure 6 is a perspective view of a reinforcing strip used in the structure.

The structure embodies essentially the side bars or members 10, each of which consists of foldably connected elements having a rule joint or stop hinge at the adjacent ends thereof adapted to bow or fold upwardly and therefore capable of resisting a downward strain by the engagement of the stop shoulders 12, and a stretcher or webbing 13 preferably of flexible or rolled material such as canvas or the equivalent thereof, having terminal cross bars 14 to which the extremities of the stretcher or webbing are attached and which are adapted to be fitted in seats 15 consisting of notches in the extremities of the side bars or members, said cross bars also having notches 16 for straddling the inner ends of the seats 15 so as to afford a transverse stiffness to the structure and prevent sliding movement of the seats 15 with relation to the cross bars. The extremities of the stretcher or webbing may be secured in any convenient manner to the cross bars and may be rolled thereon when not in use or when the device is to be folded for transportation or in order to take up slack to the end that when the device is set up for use, the cross bars being fitted in the extremities of the side bars, and the side bars being straightened to bring their elements into alignment, the stretcher or webbing is placed under a tension which serves to maintain the side bars in the extended position and afford a bearing surface which is sufficient to support the weight of an occupant.

To increase the stability of the structure when extended and guard against any possibility of the side bars buckling when the device is in use, the end portions of the said side bars are deflected upwardly as indicated at 10ª so that the line of the stretcher or webbing when taut is eccentric with relation to and above the plane of the pivotal connection of the elements of the side members. The tension of the stretcher or webbing thus locks the side bars in their extended positions and the device as so far described may be supported in any convenient manner as upon the backs of the seats of an automobile or like vehicle or with one end resting upon the running board of the vehicle to serve as a couch or bed.

Or, if preferred, supplemental supporting means may be provided for the frame, such as the legs or standards 17 for engagement with the side bars or members and preferably may be of telescoping or extensible construction with relatively adjustable members 17ª—17ᵇ. By having these legs or standards of a construction suitable for a considerable extension, they may be adjusted to support the device at a sufficient height to serve as a table for camping purposes, and as indicated in Figure 5, where the device is to be used as a table the stretcher or webbing 20 may be reinforced or supplemented by transverse strips 21 to afford a substantial supporting surface for articles placed thereon. The strips obviously are secured to the stretcher or webbing so as to be rolled therewith and when the stretcher is tensioned the adjacent side edges of the strips are in bearing relation so as to afford a reasonable degree of stability.

Having described the invention, what is claimed as new and useful is:—

A convertible couch comprising side bars composed of sections hinged together and having abutting inner ends and offset outer end portions provided at their extremities with seat recesses leading in from their end edges, cross bars having reduced end portions which enter the seat recesses, said reduced end portions being notched to receive the sides of the offset end portions of the sections, a webbing attached to the cross bars, transverse reinforcing strips attached to the webbing and having end notches which receive the side bars and foldable legs pivoted to the side bar sections.

In testimony whereof they affix signatures.

JOHN B. KRING.
FRANK E. PETERS.